J. F. STEWARD.
GRAIN-BINDER.

No. 178,342.

2 Sheets—Sheet 1.

Patented June 6, 1876.

Witnesses:

Inventor:
John F. Steward.
Per: Steet & Bond Attorneys.

2 Sheets—Sheet 2.

J. F. STEWARD.
GRAIN-BINDER.

No. 178,342. Patented June 6, 1876.

Witnesses:
O. W. Bond.
E. T. Bond.

Inventor:
John F. Steward
Per: West & Bond Attorneys.

N. PETERS, PHOTO-LITHOGRAPHER, WASHINGTON, D. C.

UNITED STATES PATENT OFFICE.

JOHN F. STEWARD, OF PLANO, ASSIGNOR TO ELIJAH H. GAMMON AND WILLIAM DEERING, OF CHICAGO, ILLINOIS.

IMPROVEMENT IN GRAIN-BINDERS.

Specification forming part of Letters Patent No. 178,342, dated June 6, 1876; application filed March 10, 1876.

*To all whom it may concern:*

Be it known that I, JOHN F. STEWARD, of Plano, Kendall county, State of Illinois, have invented new and useful Improvements in Grain-Binders for Harvesters, of which the following is a full description, reference being had to the accompanying drawings, in which—

Figure 1:
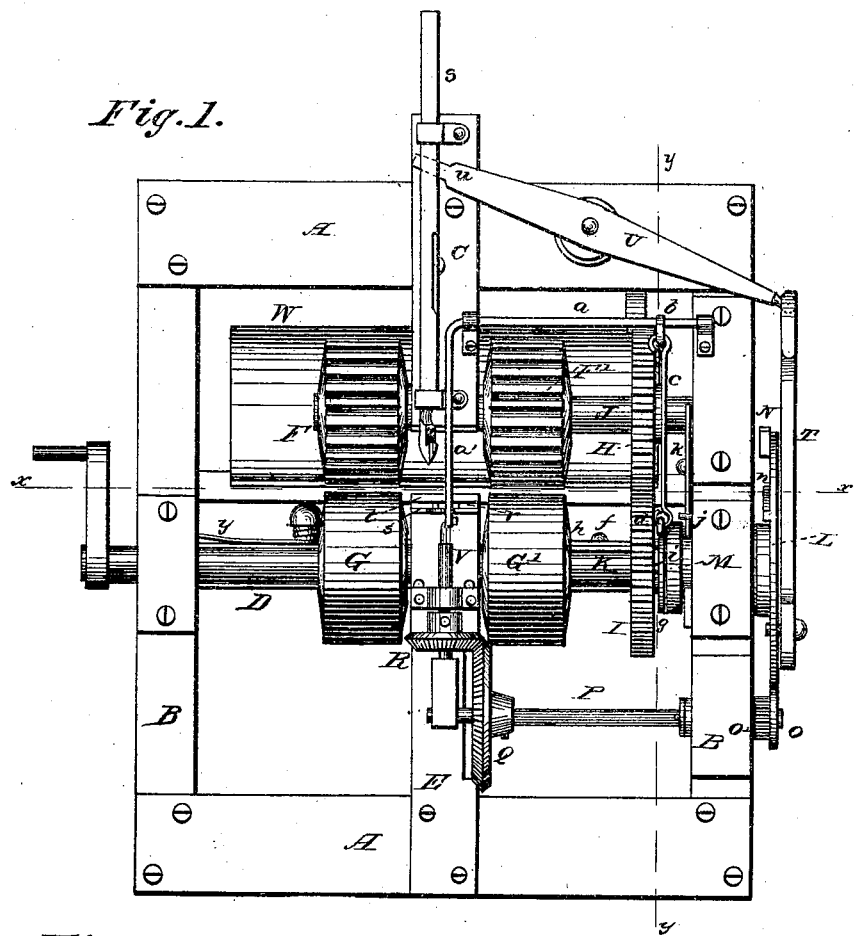
Figure 2:
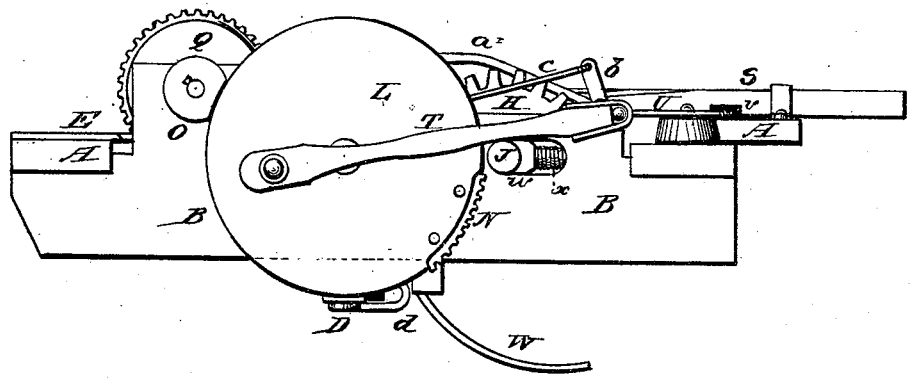
Figure 3:
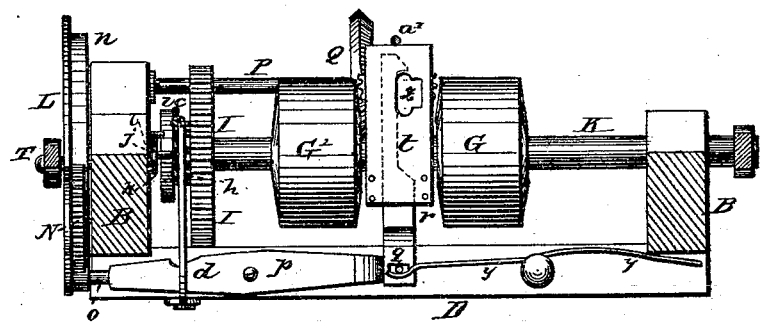
Figure 4:
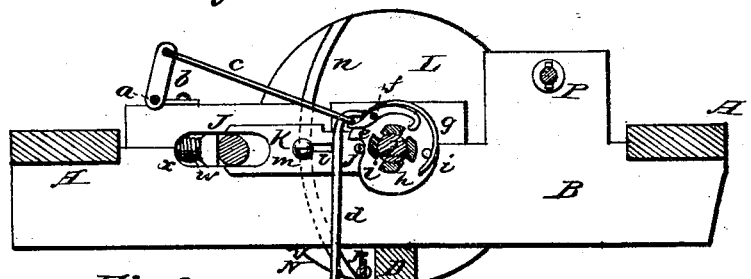
Figures 5, 6:
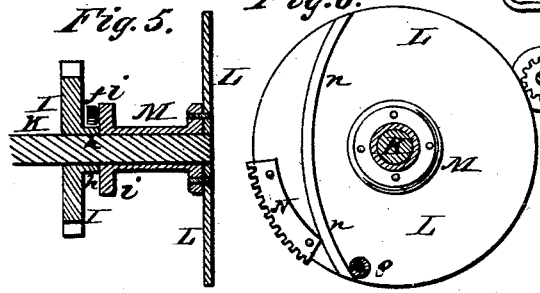
Figures 7, 8, 9:
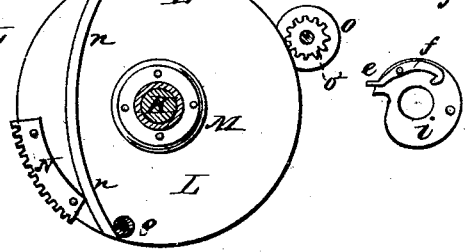
Figures 10, 11:
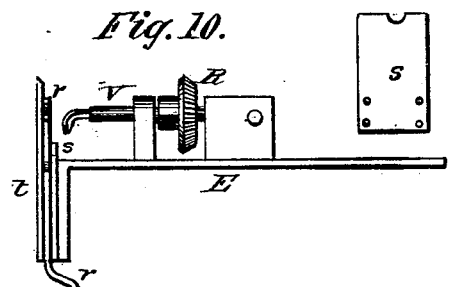

Figure 1 is a face view; Fig. 2, a side view; Fig. 3, a cross-section on line $x\,x$ of Fig. 1; Fig. 4, a cross-section on line $y\,y$ of Fig. 1; Fig. 5, a detail in section, showing the hollow shaft and its connection; Fig. 6, an inside view of the disk or broken gear-wheel; Figs. 7, 8, and 9, details of the ratchet and pawl for connecting the hollow shaft with the main shaft; Fig. 10, a side view of the cutter and twister detached; Fig. 11, a plan view of the under or fixed cutter.

This invention relates to that class of machines in which wire is used for binding the bundles; and its nature consists in arranging the feeding devices so that the grain will be compressed in passing between the rollers, and so that the approach of the grain will be stopped when a sufficient amount to form a gavel has been collected; in arranging an arm so that the flow will be stopped when a gavel of sufficient size has been collected, so as to make the bundles uniform in size, whether the grain is light or heavy, and without reference to time or to the distance traveled by the machine; in hanging the shaft carrying the feeding wheels or devices in yielding bearings, so that the quantities stopped off, or unequal quantities, pass through without straining the machine; in constructing and arranging suitable devices for throwing the feed wheel or wheels into or out of gear; in providing improved devices for operating the needle, shears, or cutter; and in the several devices and combinations hereinafter described and claimed as new.

In the drawings, A B represent any suitable frame-work or supports; C, the bar supporting the needle and one of the journal-bearings of the shaft of the feed-wheels; D, the cross-bar supporting the devices for operating the cutter or shears; E, the post or bar supporting the twister; F F', the feed-wheels; G G', the platform-rollers; H I, the gear-wheels; J K, the shafts; L, the disk or mutilated gear-wheel; M, the hollow shaft or bearing of the wheel L; N, the gear-segment of the wheel L; O O', the lock-pinion for operating the twister; P, the shaft; Q R, the miter or other suitable gear-wheel for operating the twister; S, the needle; T, the pitman; U, the pivoted bar or walking-beam, for operating the needle; V, the twister; $a$, the shaft; $a'$, the shifting-arm; $b$, the arm on the shaft $a$; $c$, the connecting-rod; $d$, the detent; $e\,f$, the pawl; $g$, the spring; $h$, the ratchet; $i$, the cam on the inner end of the hollow shaft M; $j$, the pin or projection operating on the cam $i$; $k$, the sliding plate; $l$, the slot in the plate $k$; $m$, the groove in the upper end of the plate $k$, bearing against the shaft J; $n$, the cam on the inner face of the wheel or disk L; $o$, the anti-friction collar engaging with the cam $n$; $p$, the pivoted bar or lever for operating the cutter or shears; $q$, the pin for connecting the lever $p$ with a slot or transverse opening in the heel of the cutter; $r$, the cutter; $s$, the lower plate or half of the shear-cutter; $t$, the plate placed over the cutter, to keep it in position, and keep it clear from the moving grain and dirt; $u$, the projection on the inner end of the bar U; $v$, the slot or opening in the needle; $w$, the upper journal-bearings of the shaft J; $x$, the springs pressing against the bearings $w$; $y$, the spring for returning the cutter; $z$, the needle-hole; and W the platform or guide, for directing the grain to the throat or passage between the rollers.

The frame A B may be made in any suitable form, and will be varied according to the construction of the machine to which the binder is to be attached; and in adapting it to various machines it may be placed vertical, horizontal, or at an angle, and the bars C D E will be varied accordingly.

The feed-rollers F F', as shown, are corrugated, and are of considerable length. They may, however, be made narrower, and spurs may be used in place of the corrugations shown, and in some forms the wheel F may be omitted, as the wheel F' can be used to do the feeding; but I prefer using two, as shown.

The wheels G are simply moving platforms to hold the grain up, and by making them revolve considerable friction is avoided; but by using feed-wheels of sufficient moving capacity a simple fixed platform, or side extension of the plate $t$, may be used in place of these wheels G, in which even the shaft K will revolve under them. The shaft J is hung at its outer end in a frame, and at its inner end in the bar C, or it may be extended through the bar, so as to have both journals in the outer frame-work. The journals of this shaft J are simple supports at the bottom to prevent it from dropping too low. It is provided with bearings $w$ on the upper side, which bearings are held against the shaft by means of springs X, which springs, together with the weight of the feed-wheels, give a pressure upon the moving stream of grain passing beneath them, and also permit the rising and falling of the feed-wheels to accommodate them to unequal quantities of grain, and to permit the passage, in bulk, of the grain stopped off, while the operation of binding the gavel is being performed. The shaft K is hung in a fixed bearing, at the end where the power is applied, which, as shown, is a crank; but in use it will be a pulley or gear-wheel, as may be most convenient. At the opposite end this shaft K passes through a hollow shaft, M, which forms its bearing. The gear-wheels H I are attached to the shafts J K, and engage with each other while the gavel is being formed, and are disengaged while it is being bound. The hollow shaft or collar M is attached at its outer end to the wheel or disk L, and its inner end is notched or cut away, so as to form the cam $i$, as shown at Figs. 4 and 7. The wheel L is a simple disk, partly cut away, where the segment N is attached. The segment N engages with the pinion O′, which drives the twister. The pinion O′ is provided on its head or outer end with a disk, O, which is partly cut away, as shown at Figs. 2 and 6, so as to fit against the disk L and hold the twister firmly in position, and prevent its moving until the segment N engages with the pinion O′. This disk L is provided on its inner face with a projection or cam, $n$, which engages with and operates the end of the lever $p$, which operates the cutter $r$. The pitman T is also attached to this disk L, and imparts a reciprocating movement to the walking beam or bar U, which depresses or raises the needle.

The cutter-lever $p$ is pivoted to the bar D, and it recedes the cutter when its outer end is pressed inward by the cam $n$. The cutter is returned to position by the spring $y$ or other suitable devices, or it may be returned by an additional cam on the disk L; and, as the cutter $r$ is drawn back, it brings the wire against the plate $s$, where it is severed.

The twister V is constructed similar to the twister patented to me February 15, 1876, and need not, therefore, be particularly described.

The ratchet $h$ may be attached to or made a part of the wheel I, or it may be attached directly to the shaft K. The pawl $f$ is pivoted to the enlargement or cam $i$ of the hollow shaft M, and while the gavel is being formed the pawl $f$ is kept out of contact with the ratchet $h$ by means of the detent $d$ holding against the head $e$ of the pawl $f$; and the pawl is held out of contact until sufficient grain has accumulated to press the arm $a'$ upward or forward sufficiently far to release the detent $d$ from the head $e$ of the pawl $f$, which then drops into the ratchet $h$ and causes the hollow shaft M to rotate. The detent $d$ is connected with the arm $a'$ by means of the shaft $a$, arm $b$, and rod $c$, so that lifting the arm $a'$ turns the arm $b$, so as to lift the detent $d$, when the pawl will engage with the ratchet and cause the shaft M and disk L to rotate.

When the pawl $f$ is out of contact the pin or projection $j$ of the plate $k$ rests in the lowest part of the cam $i$. As soon as the hollow shaft M commences to revolve the cam $i$ lifts the projection $j$, which at its upper end presses against the shaft J and lifts it sufficiently high to disconnect the wheels H I, when the wheel H ceases to revolve and the grain ceases to be fed into the gavel. While in this position the segment N engages with the pinion O′ and operates the twister, which operation is completed during a single revolution of the shaft K; and when the pinion O′ falls or is thrown out the arm $a'$ drops against the plate $t$, which lowers the detent $d$, so that it will catch the head $e$ of the pawl $f$ and throw it out of contact, when the disk L ceases to revolve, and after the detent $d$ has caught the pawl $f$ the projection $j$ drops to the lowest point of the cam $i$, when the wheels H and I drop or are forced into gear, and the feed again commences.

The end of the bar U, which engages with the needle, is made to pass through an opening or slot, $v$, in the needle, and is so arranged that when the needle is at its lowest point the bar will press against the opposite ends of the slot or opening $v$, as shown in Fig. 2, and hold the needle firm, and prevent any turning or vibration, which will interfere with the catching of the wire by the twister.

The wire-spool is located at any suitable point on the machine, and may be provided with any suitable tension devices.

It is obvious that the feeding and disconnecting devices may be used in cord as well as wire binders, or those using any material for a band, or even in machines designed to compress the gavel preparatory to being bound by hand.

In operation the grain is fed onto the plate $t$, by one or more rollers, F, until a sufficient quantity has been collected to move the arm $a'$ far enough to lift the detent $d$, when the feeding stops and the hollow shaft M commences to rotate with the shaft K, and carries with it the disk L, as before described. This disk L, by means of the pitman T and arm or walking-beam U, depresses the needle to its lowest point, at which point the segment N engages with the pinion O' and revolves the twister.

The same movement also lifts the wheel H out of gear with the wheel I, so that no grain is fed in while the bundle just formed is being bound. The same movement also brings the cam $n$ in contact with the outer end of the pivoted arm or lever $p$, and draws the cutter back, so as to sever the wire and release the bound bundle, which then falls out, or is thrown out. At this point the shoulder of the cam $i$ passes the projection $j$ of the plate $k$, when it drops, and throws the wheels H 1 again into gear, and the feed commences. When the bundle is thrown out the arm $a'$ falls back against the end of the plate $t$, which releases the detent $d$, and allows it to engage with the projection $e$ of the pawl $f$, so that the feeding devices will continue to revolve and feed the grain till the arm $a'$ is again pressed out sufficiently to release the detent $d$.

By this arrangement bundles of uniform size are formed, whether the grain is light or heavy, as the feeding continues until the arm $a'$ is lifted at the same point for each bundle, and while the bundle is being bound the feeding-wheels themselves form a stop for the advancing grain, which accumulates against them during the binding, and, being on a shaft hung in spring-bearings, these feeding-wheels may be lifted so as to pass the accumulated grain under them, without straining or injuring the machine.

The wire for forming the band is drawn from the twister upward across the throat, between the feed-rollers, and the grain, as it passes the rollers, is forced against said wire, carrying it out sufficiently to encircle the gavel.

It will be seen that the act of forcing the grain against the arm $a'$ will also assist in compressing the grain, and said arm may be given more resistance by a spring or other suitable means, if desired.

What I claim as new, and desire to secure by Letters Patent, is as follows:

1. One or more intermittent feed-rollers, arranged to stop or check the flow of grain while the gavel is being bound, substantially as described.

2. The combination of the rollers F F', with the supporting plate $t$, and arm $a'$, substantially as set forth.

3. The movable shaft J, in combination with the wheels H L, when arranged so that the wheels may be disengaged, substantially as set forth.

4. The arm $a'$, shaft $a$, arm $b$, rod $c$, detent $d$, spring-pawl $f$, and ratchet $h$, in combination with the bar $k$, pin or projection $j$, and cam $i$, substantially as and for the purpose described.

5. The bar $k$, provided with the pin or projection $j$, in combination with the cam $i$, for stopping the feed movement while the bundle is being bound, substantially as described.

6. The ratchet $h$ and pawl $f$, in combination with the detent $d$, for continuing the rotation of the feed-wheels until a gavel of proper size has been collected, substantially as specified.

7. The wheel or disk L, provided with the projection or cam $n$, in combination with the lever $p$, and cutter $r$, substantially as and for the purpose specified.

8. The combination of the cutter $r$ and blade $s$, with the needle S and twister V, all constructed and operating substantially as specified.

9. The slot or opening $v$ of the needle S, in combination with the extension $u$ of the bar U, arranged to lock the needle at its extreme positions, substantially as specified.

JOHN F. STEWARD.

Witnesses:
H. N. KENNEY,
ELIJAH H. GAMMON.